United States Patent [19]

Baney et al.

[11] Patent Number: 5,049,611
[45] Date of Patent: Sep. 17, 1991

[54] SILACYCLOBUTANE FUNCTIONAL POLYMERS AND THEIR PRODUCTION

[75] Inventors: Ronald H. Baney; Carl J. Bilgrien; Gary T. Burns; Lawrence D. Fiedler; Chi-long Lee, all of Midland, Mich.

[73] Assignee: Dow Corning Corporation, Midland, Mich.

[21] Appl. No.: 422,211

[22] Filed: Oct. 16, 1989

[51] Int. Cl.$^5$ ............................................. C08L 83/00
[52] U.S. Cl. .................... 524/588; 524/861; 528/15; 528/16; 528/18; 528/19; 528/31; 528/33; 528/34; 528/37
[58] Field of Search ...................... 528/33, 34, 37, 16, 528/15, 19, 18, 31; 524/861, 588

[56] References Cited

U.S. PATENT DOCUMENTS

| | | | |
|---|---|---|---|
| 3,046,291 | 7/1962 | Sommer | 260/448.2 |
| 3,398,178 | 8/1968 | Nelson | 260/448.2 |
| 3,445,495 | 5/1969 | Nelson | 260/448.2 |
| 3,687,995 | 8/1972 | Jonas et al. | 260/448.8 |
| 3,964,427 | 9/1972 | Jonas et al. | 260/18 S |

OTHER PUBLICATIONS

Khim Geterotsiki. Soedin. (Chemistry of Heterocyclic Compounds), Nametkin, Vdovin. and Babich, (1966) (4) 630.

Primary Examiner—Melvyn I. Marquis
Attorney, Agent, or Firm—Edward C. Elliott

[57] ABSTRACT

The silacyclobutane functional polydiorganosiloxane copolymers of the invention have the following structure:

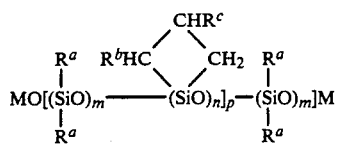

wherein M is selected from

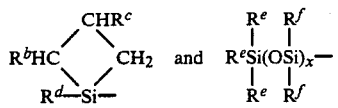

wherein $R^a$, $R^b$, $R^c$, $R^d$, $R^e$, and $R^f$ are independently monovalent radicals selected from the group consisting of hydrogen, hydrocarbon, or substituted hydrocarbon; m and x are integers of from 0 or more; n is equal to 1; and p is an integer greater than 0; with the proviso that there is at least one silacyclobutane group in the copolymer. The copolymer can be made by reacting a hydroxyl endblocked polydiorganosiloxane with either a difunctional chain extending silacyclobutane or with a monofunctional chain stopper, or a mixture of chain extender and chain stopper. The copolymer can be made into curable compositions by use of suitable catalyst.

24 Claims, No Drawings

SILACYCLOBUTANE FUNCTIONAL POLYMERS AND THEIR PRODUCTION

BACKGROUND OF THE INVENTION

1. Field of the Invention

This invention relates to silacyclobutane functional siloxanes.

2. Background information

Silacyclobutane monomers are known and have been polymerized. To applicants' knowledge, however, stable silacyclobutane functional polyorganosiloxanes have not previously been made in high yield by a method which allows controlled design of the polymer structure. The polymers of the invention are useful intermediates for formulating room temperature vulcanizable and hot air vulcanizable silicone elastomers.

The preparation of silacyclobutanes of the formula

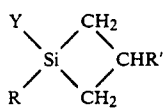

where Y is chlorine or hydrogen, R' is hydrogen or methyl, and R is a monovalent hydrocarbon radical free of aliphatic unsaturation, and polymers derived therefrom, were revealed by Sommer in U.S. Pat. No. 3,046,291, issued July 24, 1962. Polymerization was accomplished upon heating or simply standing and optionally in the presence of a catalyst from the group consisting of alkaline materials such as NaOH, KOH, LiOH; quaternary ammonium compounds; and metallic salts of sodium, aluminum, iron, cobalt, manganese, lead and zinc.

Siloxane derivatives of silacycloalkanes of the formula

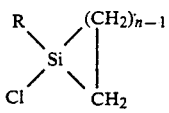

where n is 3, 4, or 5, and R is methyl, phenyl, or chlorine, were reported by Nametkin, Vdovin, and Babich in *Khim. Geterotsikl. Soedin*, (Chemistry of Heterocyclic Compounds) (1966) (4) 630. They were obtained by hydrolysis or cohydrolysis of silacycloalkanes with alkylsilanes having OH, ONa, or OAc groups at the silicon atom.

Mixtures of siloxane derivatives of silacycloalkanes are prepared by this route and contain both desireable and undesirable species whose composition is dependent upon the reaction conditions employed. Preparation of siloxane derivatives of silacyclobutanes by a hydrolysis route is also undesirable as the silacyclobutane ring is known to react with water, thus opening the silacyclobutane ring and rendering it less reactive.

U.S. Pat. No. 3,398,178, issued Aug. 20, 1968 to Nelson, teaches how silacyclobutanes react with a catalytic amount of halogenated silane, hydrohalic acid or aluminum halide to polymerize by opening the ring to form a polymer consisting essentially of

In U.S. Pat. No. 3,445,495, issued May 20, 1969, Nelson teaches the formation of similar polymers by polymerizing silacyclobutanes in the presence of a platinum catalyst, and, optionally, a silane monomer containing an SiH bond.

Jonas and Owen show alkoxy and amino silacyclobutanes in U.S. Pat. No. 3,687,995, issued Aug. 29, 1972, which they say may be reacted with organosilicon materials containing SiOH groups and therefore may be useful as cross-linking agents. This use is claimed in U.S. Pat. No. 3,694,427. These compositions have the disadvantage of undergoing gradual increase in viscosity with time, requiring the components to be stored separately if spontaneous thickening is undesirable. Further, these formulations emit volatile condensation by-products.

SUMMARY OF THE INVENTION

Silacyclobutane functional polydiorganosiloxane copolymers which can be crosslinked to give a useful 3-dimensional network structure are prepared from a hydroxyl endblocked polydiorganosiloxane, a dihydrolyzable silacyclobutane, and a monohydrolyzable silane.

DESCRIPTION OF THE INVENTION

The silacyclobutane functional polydiorganosiloxane copolymers of the invention have the following structure:

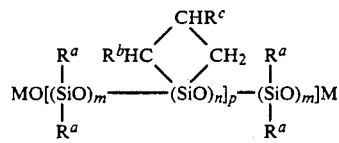

wherein M is selected from

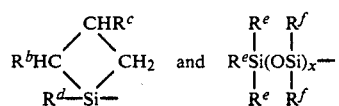

wherein $R^a$, $R^b$, $R^c$, $R^d$, $R^e$, and $R^f$ are independently monovalent radicals selected from the group consisting of hydrogen, hydrocarbon, or substituted hydrocarbon; m and x are integers of from 0 or more; n is equal to 1; and p is an integer greater than 0; with the proviso that there is at least one silacyclobutane group in the copolymer. Generally, the copolymer will have an average molecular weight between 1,000 and 1,000,000.

The silacyclobutane functional polydiorganosiloxane copolymers can be made by reacting a siloxane of the formula $HO(R^a{}_2SiO)_mH$ with either a chain extending silacyclobutane of the formula

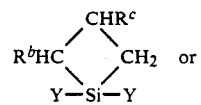

-continued

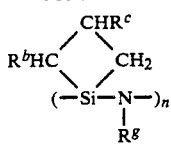

or with a chain stopper selected from those of the formula

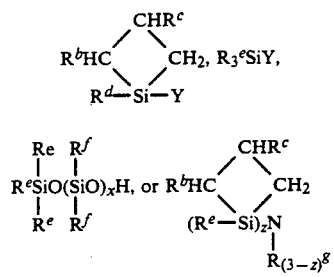

wherein Y is a radical or atom reactive with the SiOH group and selected from the group consisting of halogen,

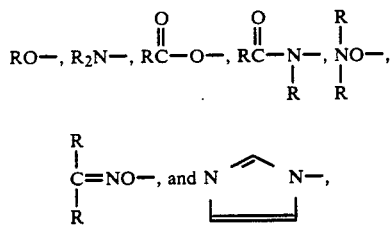

or both chain extender and chain stopper, wherein R is independently a monovalent radical, as are $R^a$, $R^b$, $R^c$, $R^d$, $R^e$, $R^f$ and $R^g$, and wherein m is an integer sufficient to define a polydiorganosiloxane, i.e., 2 or more, n is an integer of from three to five and z is an integer of from one to three.

Exemplary of suitable monovalent radicals for the R, $R^a$, $R^b$, $R^c$, $R^d$, $R^e$, $R^f$, and $R^g$ groups are hydrogen, the hydrocarbons, or substituted hydrocarbons. Thus, for example, these groups can be alkyl such as methyl, ethyl, propyl or octadecyl; substituted alkyl such as aminopropyl or thiopropyl; haloalkyl such as chloropropyl; aryl such as phenyl, xenyl or naphthyl; alkaryl such as tolyl or xylyl; aralkyl such as benzyl; unsaturated alkenyl such as vinyl, propenyl, or hexenyl; and unsaturated alkynyl such as acetylenyl or propynyl. $R^a$, $R^e$, and $R^f$ are preferably methyl, vinyl, phenyl, ethyl, hydrogen, or trifluoropropyl, and most preferably methyl. $R^d$ is preferably methyl, ethyl, vinyl, phenyl, or hydrogen, and most preferably methyl. $R^b$, $R^c$, and $R^g$ are preferably methyl or hydrogen and most preferably hydrogen. The cyclobutane ring containing the $R^b$ and $R^c$ radicals can be substituted or unsubstituted. The term "silacyclobutane" throughout this disclosure is intended to include either the unsubstituted cyclobutane ring or the substituted ring.

Suitable halogens for Y are chlorine and bromine with the former preferred. Suitable RO- groups include $CH_3O-$, $CH_3CH_2O-$, and $CH_2=C(CH_3)O-$. Suitable $R_2N-$ groups include $H_2N-$ and $(CH_3CH_2)_2N-$.

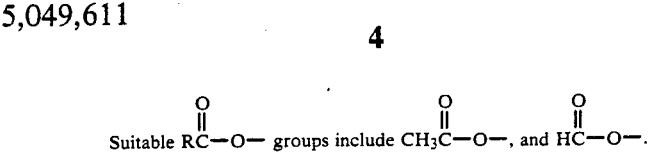

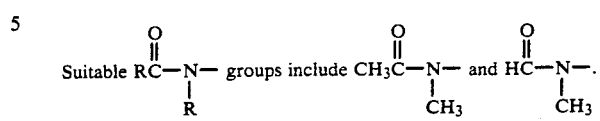

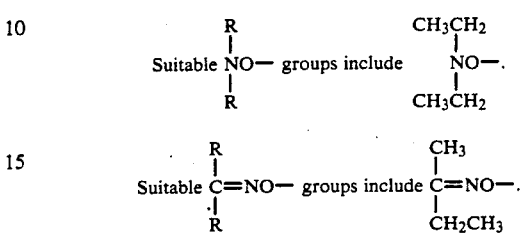

It is preferred that the Y groups of the difunctional chain extender be the same as the Y group of the monofunctional endblocker. It is also most preferred that the Y group is Cl. The use of a difunctional chain extender is not necessary if a difunctional siloxane polymer endcapped with the silacyclobutane group is the desired product. Further, the use of a monofunctional endblocker is optional if the polymer composition is required to crosslink upon mixing of the silanol terminated polysiloxane and the difunctional silacyclobutane chain extender. The use of a monofunctional silacyclobutane endcapper is preferred if a room temperature stable, fluid polymer is desired.

The polymers can be prepared by mixing the ingredients together at a mild temperature between about $-50°$ C. and about $100°$ C., at atmospheric pressure and, optionally, with a solvent. Suitable solvents include toluene, tetrahydrofuran, diethyl ether, benzene, chloroform, and methylene chloride. For best results, the polydiorganosiloxane, $HO(R^a{}_2SiO)_mH$, has a hydroxyl stoichiometry equivalent to or up to 10 percent less than the reactive groups (Y) on the silacyclobutane. When the silacyclobutane has one or more halogen groups, it is preferred to use a hydrogen halide acceptor in the reaction mixture. Typical hydrogen halide acceptors include: calcium carbonate, triethylamine, or pyridine. Any solid byproducts can be removed by filtration.

The solvent and volatile byproducts can be removed by reduced pressure distillation and a fluid polymer recovered. It will be seen from the examples that, without an end blocker, a gel is formed as the polymer molecular weight is uncontrollable, and partial crosslinking may occur. There may be some unreacted hydroxyl groups present in the copolymer also, depending upon the ratio of the ingredients used in the preparation.

The silacyclobutane functional polydiorganosiloxane copolymers of the invention may be cured to useful elastomers by vulcanization to cause ring opening polymerization of the silacyclobutane groups and formation of a crosslinked network of polydiorganosiloxanes. Generally, a temperature of greater than $150°$ C. is required to crosslink the polydiorganosiloxane copolymers in a useful time of less than 1 day. A catalyst may be used to lower the cure temperature and accelerate the rate of cure. Useful catalysts include compounds and supported metals of the noble (platinum group) metals and compounds of aluminum, zinc and tin. Preferred are homogeneous compounds and supported heterogeneous metal catalysts of platinum, palladium, rhodium, ruthenium and iron, and most preferred are homogeneous and heterogeneous catalysts of platinum. Metal concentrations of from 0.1 to 1000 ppm may be used with a preferred range of 5 to 50 ppm metal. In the presence of this type of catalyst, the vulcanization time will vary with the form of catalyst, concentration of catalyst and temperature. Vulcanization temperatures of greater than 100° C. are preferred to cure the silacyclobutane functional polydiorganosiloxane copolymers in a useful time, but vulcanization can be slowly accomplished even at room temperature in the presence of a catalyst.

The rate of vulcanization can be further accelerated by the addition of an organosilicon compound containing an SiH bond. Further, the degree of crosslinking and hence the physical properties of the cured elastomer can be predictably varied by adjusting the concentration of SiH functional material. Useful SiH organosilicon compounds may contain one or more silicon atoms and one or more SiH bonds. The concentration of the SiH functional organosilicon compound can be described by the ratio of SiH functionality to silacyclobutane group and may vary from greater than zero with no upper limit. A preferred SiH to silacyclobutane ratio is from 0.001 to 2.0 and most preferred is a ratio of 0.1 to 0.5 with the understanding that the preferred ratio of SiH to silacyclobutane depends upon the degree of crosslinking required for the product elastomer.

The preparation of polyorganosiloxane elastomers by vulcanization is generally accomplished in the art by heating the polymer formulation in the presence of organic peroxides or by heating a formulation of ethylenically unsaturated and SiH functional polyorganosiloxanes in the presence of a metal, preferably platinum, catalyst. For the latter, crosslinking is accomplished by the addition of the SiH bond to the unsaturated group, a reaction known as hydrosilation. For this cure system, the ratio of SiH to unsaturated groups is generally kept greater than 1. The vulcanization of silacyclobutane functional polydiorganosiloxanes with SiH functional materials thus requires the use of less SiH functional material than the vulcanization of unsaturated functional polydiorganosiloxanes. Additionally, the vulcanization of silacyclobutane functional polydiorganosiloxanes in the presence of SiH functional materials leads to a higher crosslink density than vulcanization of comparable vinyl functional polydiorganosiloxanes in the presence of SiH functional materials.

The vulcanization of silacyclobutane functional polydiorganosiloxane copolymers may be performed in the presence of additives known in the art to improve the processing, cure and resultant physical properties of the material. Such additives include, but are not limited to, fillers such as fumed silica, carbon black, iron oxide and calcium carbonate; process aids such as silicone fluids; pigments; adhesion promoters; mold release agents; stabilizers such as metals and their oxides; and catalysts.

Vulcanization of the silacyclobutane functional polydiorganosiloxanes may be accomplished by heating in a mold or oven. Heating may also be performed by irradiation with infrared, ultraviolet, photomagnetic, or microwave radiation and, optionally, in the presence of a material which absorbs the incident radiation. Heating may also be performed inside an oscillating magnetic field in the presence of paramagnetic material, a process known as induction heating.

The silacyclobutane group has been shown to be inert to free radicals in the condensed phase and at or near room temperature. Therefore, crosslinking of silacyclobutane functional polydiorganosiloxanes by ultraviolet irradiation in the presence of a photoinitiator or electron beam irradiation is not expected to occur. However, the silacyclobutane functional polydiorganosiloxanes were found to undergo crosslinking under ultraviolet light when a photoinitiator was present at rates slightly faster than in control experiments with polydiorganosiloxanes containing only methyl functionality. Similarly, the silacyclobutane functional polymers underwent electron beam curing at rates slightly faster than the polymers containing only the methyl group.

The silacyclobutane functional polydiorganosiloxane copolymers of the invention may also be crosslinked upon exposure to atmospheric moisture, a process known as room temperature vulcanization (RTV). This process can be accelerated in the presence of a nucleophilic or basic catalyst. Hydrolysis of the silacyclobutane group is thought to provide an n-propyl silanol which can undergo condensation to give a siloxane bond:

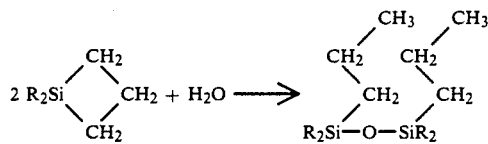

Thus, when the silacyclobutane groups are attached to a polymer chain, they can react with water and condense to form a siloxane bond between the polymer chains. This cure system has a distinct advantage over conventional RTV cure systems used in the art to crosslink silicones: no volatile condensation byproducts such as acetic acid, alcohol, ketone, oxime or amine are generated during curing and therefore no byproducts are released. An RTV silicone which does not release condensation byproducts is desireable in confined spaces where the byproduct cannot dissipate or in applications where the cure byproduct poses a safety, flammability, toxicity, irritation or environmental hazard. Additionally, a cure system which evolves no condensation byproduct is desired to give lower shrink upon exposure to moisture.

The silacyclobutane functional polymers of the invention may be formulated into one part RTV sealants consisting of the following parts:
A. The silacyclobutane functional polymer as defined previously
B. Catalyst
C. Optional filler and other additives The catalyst (B.) is HONR$_2$ or diorganoaminoxy functional polyorganosiloxane such as R$_3$SiO(R$_2$SiO)$_a$(RXSiO)$_b$SiR$_3$ or (RXSiO)$_c$(R$_2$SiO)$_d$ where X is —ONR$_2$, a and d are equal to or greater than 0, b is equal to or greater than 1, c plus d is equal to or greater than 3, and R is a monovalent radical. The preferred catalyst is diethylhydroxyl amine. The optional fillers include silica, alumina, metal carbonates and metal oxides. The sealant may be extruded and cured by atmospheric exposure.

The following examples will serve to illustrate the invention. All parts and percentages in said examples and elsewhere in the specification and claims are by weight unless otherwise indicated.

EXAMPLE 1

To a solution of 100 g HO(Me$_2$SiO)$_x$H, (0.23 percent OH by weight and a number average molecular weight (Mn) of 14,500, Polymer A) and 7.10 g triethylamine in 100 g diethyl ether was added a solution of 1.80 g 1-chloro-1-methylsilacyclobutane in 19 g diethyl ether. The polymer solution was stirred for 16 hours, filtered and stripped to 70° C. and 1 mm Hg to give 95 g of clear polymer. The polymer was characterized by gel permeation chromatography. It had a weight average molecular weight (Mw) of 38,000, a number average molecular weight (Mn) of 15,000, and a dispersion ratio (Mw/Mn) of 2.5.

Incorporation of the silacyclobutane group into the polymer was demonstrated by crosslinking of the polymer upon heating in the presence of a platinum catalyst. A catalyst was prepared from chloroplatinic acid complex of divinyltetramethyldisiloxane diluted with dimethylvinylsiloxy endblocked polydimethylsiloxane to provide 0.7 weight percent platinum. To 1.02 g of the above polymer was added 2.0 milligrams of the above catalyst to give a concentration of 13 parts of platinum per million parts of polymer (ppm). An 8 mil film of the mixture was drawn onto an aluminum panel and the fluid film heated at 157° C. for ten minutes to give a free standing elastomeric film. When polymer A, containing no silacyclobutane group, was similarly vulcanized with the platinum catalyst, it failed to undergo crosslinking, and an elastomer was not formed.

EXAMPLE 2

To a solution of 50.2 g HO(Me$_2$SiO)$_x$H (1.82 percent OH by weight and a Mn of 2,400, Polymer B) and 32.5 g triethylamine in 153 g diethyl ether was added a solution of 6.04 g 1,1-dichlorosilacyclobutane in 20 g diethyl ether. After stirring for 10 minutes, a solution of 2.33 g trimethylchlorosilane in 20 g diethyl ether was added, and stirring continued for 135 minutes. The mixture was filtered, stripped to 50° C./0.4 mm Hg, redissolved in ether, pressure filtered through 0.45 micron pore size membrane and stripped to 50° C./0.4 mm Hg to give a clear colorless fluid having a Mw of 40,000, a Mn of 19,000, and a Mw/Mn of 2.1. This polymer was characterized by proton NMR, which showed a chemical shift of delta equal to 1.52 ppm for the silacyclobutane protons and 0.17 ppm for the methyl protons. Integration gave a ratio of one Si(CH$_2$CH$_2$CH$_2$) group per 17 Si(CH$_3$)$_2$ groups.

The above polymer was vulcanized at room temperature by mixing in a catalytic amount of diethylhydroxylamine in the amount shown in Table I, pouring the catalyzed material into a 1 inch by 1 inch chase to a thickness of 0.15 inch, and then exposing to atmospheric moisture at 37 percent relative humidity. The skin over time (SOT) and tack free time (TFT) were measured as the materials cured. The SOT is the time for a nonflowable skin to form over the surface. The TFT is the time required for the surface to reach a degree of cure such that a 1 inch wide strip of polyethylene film applied to the surface peels freely away without any material sticking to the film.

TABLE I

| Sample No. | Polymer (grams) | Et$_2$NOH (gram) | SOT (hours) | TFT (hours) |
|---|---|---|---|---|
| 1 | 5.01 | 0.34 | 1.0 | 3.7 |
| 2 | 5.01 | 0.084 | 1.0 | 4.5 |
| 3 | 5.02 | 0.017 | 2.5 | 4.5 |
| 4 | 7.32 | 0.0069 | 3.7 | 5.5 |
| 5 | 5.0 | 0 | did not cure | |

Samples 1 through 4 were stored in aluminum tubes at least 4 months and were found to be stable in the absence of moisture. When exposed to moisture, they cured at a rate comparable to the initial rate shown in Table I.

EXAMPLE 3

To a solution of 150.7 g of HO(Me$_2$SiO)$_x$H, (0.14 percent OH by weight and a Mn of 24,000, Polymer C) and 2.54 g triethylamine in 350 g diethyl ether was added a solution of 0.16 ml 1-chloro-1-methylsilacyclobutane and 0.72 ml 1,1-dichlorosilacyclobutane in 50 ml diethyl ether. The mixture was stirred for 3 hours, filtered and stripped to 75° C./1.5 mm Hg to give a clear polymer having a Mw of 582,000, a Mn of 127,000, and a Mw/Mn of 4.6. To 43 g of this polymer was milled in enough of the platinum catalyst of Example 1 to give 19 ppm platinum. The catalyzed gum cured to an elastomer upon standing at room temperature for one day. In the absence of catalyst, the gum remained fluid after two weeks.

To 35 g of the polymer was added enough of the platinum catalyst to give 19 ppm platinum. The product catalyzed gum was molded into a sheet and heated at 180° C. for 20 minutes to give an elastomer with a tensile strength of 53 psi, an elongation of 509 percent, and a modulus at 200 percent elongation of 22 psi.

EXAMPLE 4

This composition contained no endblocker and the composition formed was a crosslinked gel. To 150 g of Polymer C and 2.55 g of triethylamine in 352 g of diethyl ether was added a solution of 0.80 ml 1,1-dichlorosilacyclobutane in 50 g diethyl ether. After stirring for 21 hours, the mixture was filtered and stripped to 75° C. at 1.5 mm Hg. The clear colorless polymer exhibited viscous flow but gelled to a crosslinked elastomer upon standing for 11 days.

EXAMPLE 5

To 100 g of Polymer B was added 9.94 g

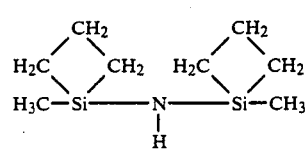

and 10 ml toluene. The solution was stirred for 15 days and then stripped to 81° C. at 4 mm Hg to give a slightly hazy fluid.

To 0.50 g of the product polymer was added 3.1 mg of a 0.4 percent solution of di-mu-chloro-dichlorobis(-tri-n-butylphosphine)diplatinum in toluene to give 55 ppm platinum. The mixture was vulcanized at 135° C. for 20 minutes to give a hard crosslinked elastomer.

To another 0.5 g of the product polymer was added 5.5 mg of a 5.0 percent solution of tris(triphenylphosphine)rhodium chloride in toluene to give 60 ppm rhodium. The mixture was heated at 205° C. for 20 minutes to give a hard crosslinked elastomer. In the absence of a catalyst, the polymer showed no sign of crosslinking after heating at 205° C. for 2 hours. In the absence of catalyst, the product polymer remained fluid after 16 months.

EXAMPLE 6

To a solution of 50.0 g Polymer B in 100 g toluene was added a solution of 2.06 g

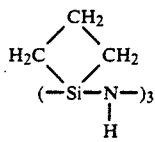

in 15 ml toluene. The mixture was stirred 20 minutes at 25° C., then 16 hours at 70° C., then 72 hours at 25° C. Enough toluene was added to give 167 g total solution which was divided as follows: A. To 55.4 g of the solution was added 0.24 g

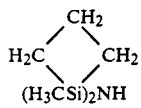

in 10 ml toluene.

The mixture was stirred at 70° C. for 7.5 hours, then at 25° C. for 20 hours. The mixture was stripped to 75° C./1 mm Hg to yield 17.0 g viscous fluid with a slight haze having a Mw of 21,000, a Mn of 7,000, and a Mw/Mn of 3. To 2 g of the product polymer was added 64 mg of the catalyst of example 1 to give 200 ppm platinum. The mixture was poured into an aluminum cup and heated 10 minutes at 150° C. to give a hard elastomer. The product polymer did not cure after 30 minutes at 200° C. in the absence of catalyst.

B. As a comparative example, no endblocker was added to a portion of the solution and solvent removal as above gave a crosslinked gel. The remainder of the solution was stripped to 75° C. at less than 1 mm of Hg to give a clear, viscous fluid. The fluid gelled to a crosslinked solid after 24 hours.

EXAMPLE 7

To a mixture of 75.0 g of Polymer A, 3.16 g of triethylamine and 10.2 g of anhydrous magnesium sulfate in 227 g diethyl ether was added 1.53 ml 1-acetoxy-1-methylsilacyclobutane. This mixture was stirred 48 hours, filtered and stripped to 73° C. and 0.6 mm Hg to give 73.5 g of clear colorless fluid having a Mw of 39,000, a Mn of 22,000, and a Mw/Mn of 1.8.

To 1 g of this polymer was added 1.9 mg of the catalyst of Example 1. The mixture was poured into an aluminum cup and heated at 155° C. for 5 minutes to give a crosslinked elastomer. In the absence of catalyst, the polymer failed to cure upon heating for 20 minutes at 180° C., but cured to a weak elastomer upon heating for 20 minutes at 202° C.

EXAMPLE 8

To a mixture of 152 g Polymer C and 15.3 g anhydrous magnesium sulfate in 352 g diethyl ether was added a solution of 0.197 g 1-acetoxy-1-methylsilacylobutane and 1.15 g 1,1-diacetoxysilacyclobuane in 50 ml diethyl ether. The mixture was stirred for 3 hours, filtered and stripped to 75° C./1.5 mm Hg to give 149.2 g of clear colorless copolymer having a Mw of 340,000, a Mn of 88,000, and a Mw/Mn of 3.9.

To 47 g of the product polymer was milled in 0.14 g of the catalyst of Example 1 to give 20 ppm platinum. The catalyzed gum was heated at 180° C. for 22 minutes in an electric press to yield an elastomer with tensile strength of 31 psi, elongation of 266 percent, and modulus at 200 percent elongation of 21 psi.

EXAMPLE 9

To 10 g Polymer A was added 0.09 g 1,1-diacetoxysilacyclobutane and 0.04 g trimethylsilylacetate. Following mixing and 23 hours in a vacuum chamber to remove volatiles, the product copolymer was a clear colorless fluid having a Mw of 561,000, a Mn of 110,000, and a Mw/Mn of 5.1. To 1 g of the product polymer was added 1.9 mg of the catalyst of Example 1 to give 11 ppm platinum. The mixture was poured into an aluminum cup and heated at 156° C. for 20 minutes to give a crosslinked elastomer.

EXAMPLE 10

This formulation contained no end blocker and gave a crosslinked elastomer. To 10.1 g Polymer A was added 0.11 g 1,1-diacetoxysilacyclobutane. The mixture was placed in a vacuum chamber to remove volatiles and solidified to an elastomeric foam after 23 hours.

EXAMPLE 11

To 10.1 g of Polymer A was added 0.185 g 1-methyl-1-(N-methylacetamido)silacyclobutane,

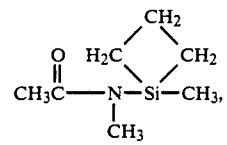

to give a hazy fluid having a Mw of 38,000, a Mn of 19,000, and a Mw/Mn of 2. To 1.1 g of the product polymer was added 2.4 mg of the catalyst prepared in Example 1 to give 14 ppm platinum. The mixture was poured into an aluminum cup and heated at 157° C. for 20 minutes to yield a weak elastomer.

EXAMPLE 12

To a mixture of 189 g Polymer C and 19.8 g anhydrous magnesium sulfate in 353 g of tetrahydrofuran was added a solution of 1.60 g 1,1-bis(N-methylacetamido)silacyclobutane

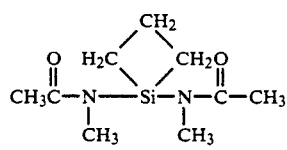

and 0.26 g 1-methyl-1(N-methylacetamido)silacyclobutane in 50 ml tetrahydrofuran. The mixture was stirred for 41 hours, filtered and stripped to 75° C. at 0.8 mm Hg to give 165 g of hazy viscous fluid having a Mw of 183,000, a Mn of 95,000, and a Mw/Mn of 1.9. Into 23 g of the product polymer was milled 7.7 mg of the catalyst of Example 1 to give 20 ppm platinum. The mixture was heated at 180° C. for 20 minutes to yield a weak elastomer. The catalyzed polymer cured to an elastomer after five months at room temperature. The uncatalyzed polymer remained a viscous fluid after six months.

EXAMPLE 13

To 10 g of Polymer A was added 0.047 g N-methyl-N-(trimethylsilyl)acetamide. After stirring, 0.416 g of a 22.56 percent by weight solution of 1,1-bis(N-methylacetamido) silacyclobutane in chloroform was stirred in to give a viscous fluid having a Mw of 147,000, a Mn of 61,000, and a Mw/Mn of 2.4. To 1.1 g of the product polymer was added 7.9 mg of the catalyst of Example 1 to give 47 ppm platinum. The mixture was heated at 157° C. for 20 minutes to yield a weak elastomer.

EXAMPLE 14

To a mixture of 10 g Polymer A and 0.184 g Me$_3$SiO(-Me$_2$SiO)$_3$H was stirred in 0.854 g of a 22.56 percent by weight solution of 1,1-bis(N-methylacetamido)silacyclobutane in chloroform to give a viscous fluid having a Mw of 106,000, a Mn of 44,000, and a Mw/Mn of 2.4. To 1.1 g of the product polymer was added 6.7 mg of the catalyst of Example 1 to give 39 ppm platinum. The mixture was heated at 157° C. for 20 minutes to give a crosslinked gel.

EXAMPLE 15

This composition contained no endblocker and gave a crosslinked elastomer. To 10 g of Polymer A was added 1.13 g of a 22.52 percent solution of 1,1-bis(N-methylacetamido) silacyclobutane in dimethylformamide. Upon stirring, the composition gelled to a weak elastomer.

EXAMPLE 16

To a solution of 50 g of Polymer B and 32.5 g triethylamine in 152 g of diethyl ether was added a solution of 6.05 g 1,1-dichlorosilacyclobutane in 20 g of diethyl ether. After stirring the mixture for 30 minutes, a solution of 2.59 g of 1-chloro-1-methylsilacyclobutane in 14 g diethyl ether was added and stirring continued for 140 minutes. The mixture was then stripped to 50° C. at 0.4 mm Hg pressure, redissolved in ether, twice pressure filtered through 0.45 micron pore size membrane, and stripped to 50° C. at 0.4 mm Hg pressure to give a clear colorless fluid. The fluid had a Mw of 28,400, Mn of 12,200, and a Mw/Mn ratio of 2.3.

The above polymer was vulcanized and tested as in Example 2 with the results shown in Table II.

TABLE II

| Sample No. | Polymer (grams) | Et$_2$NOH (gram) | SOT (Hour) | TFT (Hours) |
|---|---|---|---|---|
| 1 | 5.0 | 0.52 | 1 | 1.6 |
| 2 | 5.0 | 0.14 | 1 | 1.6 |
| 3 | 5.0 | 0 | | did not cure |

EXAMPLE 17

A silacyclobutane functional polymer was prepared, formulated with silica filler, process aids, catalyst, and crosslinker. Test samples of cured elastomer were prepared and tested.

To a solution of 900 g of polymer C, 40 g of magnesium sulphate, and 27.4 g of triethylamine in 900 g of diethyl ether was added 10.1 g of 1-chloro-1-methylsilacyclobutane. The solution was stirred for 24 hours, filtered, stripped to 80° C. at 1 mm Hg pressure, and further stripped for 15 hours at 95° C. in a vacuum oven, to give polymer 17A.

A second, lower molecular weight polymer was similarly prepared. To a solution of 200 g of polymer A, 10 g magnesium sulphate, and 9.44 g triethylamine in 200 g diethyl ether was added 3.34 g 1-chloro-1-methylsilacyclobutane. The solution was stirred for 23 hours, filtered, stripped to 83° C. at 2 mm Hg pressure, and further stripped for 3 days at 95° C. in a vacuum oven, to give polymer 17B.

A silica filler was prepared by mixing 600 g of fumed silica having a surface area of about 250m$^2$/g, 60 g of phenyltrimethoxysilane and 0.6 g hexamethyldisilazane for one hour.

A liquid silicone rubber base was prepared by mixing 358 g of polymer 17A, 275 g of the above treated filler, and 27.5 g of hydroxyl endblocked polydimethylsiloxane, having about 7.3 weight percent hydroxyl, for 1 hour at 87° C. and 16 inches of vacuum. The mixture was cooled and mixed with 258 g of polymer 17A and 170 g of polymer 17B for one hour to give polymer 17C.

Part 1 of a two part system was prepared by mixing 210 g of polymer 17C and 0.46 g of the catalyst of Example 1 for 2 minutes in a dental mixer. A series of part 2 were prepared by mixing polymer 17C and crosslinker material which was a trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent together in the amounts shown as follows:

| Part 2 | Polymer 17C (grams) | Crosslinker (gram) | mole SiH / mole SCB |
|---|---|---|---|
| 2a | 30.0 | 0.16 | 0.25 |
| 2b | 30.1 | 0.24 | 0.375 |
| 2c | 30.1 | 0.32 | 0.50 |
| 2d | 30.1 | 0.46 | 0.75 |
| 2e | 30.1 | 0.61 | 1.00 |
| 2f | 25.0 | 0.62 | 1.25 |
| 2g | 30.1 | 0.91 | 1.50 |

SCB = silacyclobutane

Parts 1 and 2 were injected into adjacent sides of dual side-by-side extrusion tubes, centrifuged to remove air, and coextruded in equal amounts through a static mixing nozzle into a chase, where it was formed into a test sheet and cured as shown in Table III. The cured test sheet was then cut into test samples and the physical properties of the samples measured in accordance with ASTM D 412, with the results as shown in Table III.

TABLE III

| Part 2 | Cure | Tensile Strength (psi) | Elongation (percent) | 200% Modulus (psi) |
|---|---|---|---|---|
| a | a | 820 | 326 | 410 |
| b | b | 988 | 396 | 363 |
| c | a | 795 | 337 | 365 |
| d | b | 813 | 359 | 341 |
| e | a | 996 | 442 | 296 |
| f | b | 903 | 411 | 300 |
| g | b | 1026 | 527 | 226 | cure a was 15 min. at 150° C.
cure b was 10 min. at 150° C.

EXAMPLE 18

A silacyclobutane functional polydimethylsiloxane was generated as follows: To 100 g of Polymer A and 4.86 g triethylamine in 100 g ether was added a solution of 0.79 g 1,1-dichlorosilacyclobutane and 1-chloro-1-methylsilacyclobutane in 21 g ether. The polymer solution was stirred for 16 hours, filtered, stripped to 70° C. at 1 mm Hg pressure, and filtered through 0.65 micron pore membrane filter, to give a polymer having a Mw of 122,600, and a Mn of 44,000.

A composition was formulated by mixing 0.76 g of this polymer, 0.0017 g of the platinum catalyst of Example 1, and 0.085 g of carbon black. A slab of this composition was irradiated on a glass plate inside a commercial kitchen microwave oven for 1 minute to give a strong, cured elastomer.

That which is claimed is:

1. Silacyclobutane functional polydiorganosiloxane copolymers of the structure

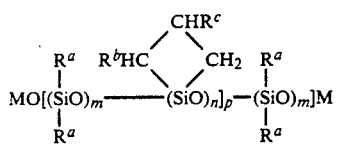

wherein M is selected from

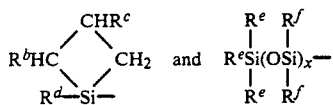

wherein $R^a$, $R^b$, $R^c$, $R^d$, $R^e$, and $R^f$ are independently monovalent radicals selected from the group consisting of hydrogen, hydrocarbon, or substituted hydrocarbon; m and x are integers of from 0 or more; n is equal to 1; and p is an integer greater than 0; with the proviso that there is at least one silacyclobutane group in the copolymer.

2. The copolymer of claim 1 wherein the average molecular weight is between about 1,000 and about 1,000,000.

3. The copolymer of claim 2 wherein $R^a$, $R^b$, $R^c$, $R^d$, $R^e$, and $R^f$ are hydrogen or alkyl radicals.

4. The copolymer of claim 3 wherein the alkyl radicals are methyl.

5. The copolymer of claim 4 wherein $R^a$ and $R^d$ are methyl radicals and $R^b$ and $R^c$ are hydrogen.

6. A process for making the silacyclobutane functional polydiorganosiloxane copolymers of claim 1 consisting essentially of reacting a siloxane of the formula $HO(R^a{}_2SiO)_mH$ with either a chain extending silacyclobutane (a) of the formula

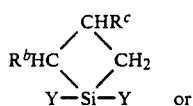

or with a chain stopper (b) selected from the group consisting of those of the formula

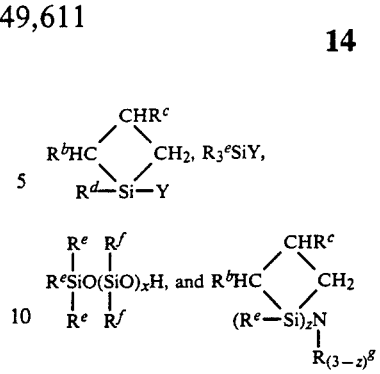

or with both (a) and (b), wherein Y is a radical or atom reactive with the SiOH group selected from the group consisting of halogen, RO-, $R_2N$-,

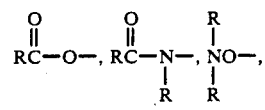

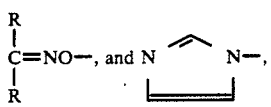

wherein R, $R^a$, $R^b$, $R^c$, $R^d$, $R^e$, $R^f$ and $R^g$ are independently monovalent radicals selected from the group consisting of hydrogen, hydrocarbon, or substituted hydrocarbon, and wherein n is an integer of from three to five, m is an integer sufficient to define a polydiorganosiloxane and z is an integer of from one to three, the moles of hydroxyl of the siloxane being from 80 to 100 percent of the moles of Y.

7. The process of claim 6 wherein the process is carried out by mixing the ingredients at a temperature of between −50° C. and 100° C. and allowing them to react.

8. The process of claim 6 wherein $R^a$, $R^b$, $R^c$, $R^d$, $R^e$, $R^f$, and $R^g$ are hydrogen or alkyl radicals.

9. The process of claim 8 wherein the alkyl radicals are methyl.

10. The process of claim 9 wherein $R^a$ and $R^d$ are methyl radicals and $R^b$ and $R^c$ are hydrogen.

11. The process of claim 6 wherein Y is chlorine.

12. The process of claim 11 wherein a hydrogen halide acceptor is present.

13. The process of claim 12 wherein the hydrogen halide acceptor is triethylamine.

14. The process of claim 13 wherein a non-reactive solvent is present.

15. The process of claim 6 wherein the chain extender is selected from the group consisting of 1,1-dichlorosilacyclobutane, 1,1-diacetoxysilacylobutane, and 1,1-bis(N-methylacetamido)silacyclobutane.

16. The process of claim 6 wherein the chain stopper is selected from the group consisting of 1-chloro-1-methylsilacyclobutane,

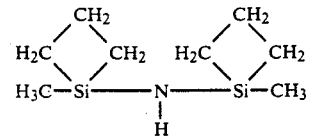

1-acetoxy-1-methylsilacyclobutane, trimethylsilylacetate, and 1-methyl-1-(N-methylacetamido)silacyclobutane.

17. A curable composition comprising the polymer of claim 1 and a catalyst selected from the group consisting of platinum, palladium, rhodium, ruthenium, aluminum, zinc, tin, iron, and their salts.

18. The composition of claim 17 wherein the catalyst is platinum.

19. A composition curable upon exposure to moisture comprising the polymer of claim 1 and a nucleophilic catalyst.

20. The composition of claim 19 wherein the nucleophilic catalyst is selected from the group consisting of $HONR_2$ or diorganoaminoxy functional polyorganosiloxane of the formula $R_3SiO(R_2SiO)_a(RXSiO)_bSiR_3$ or $(RXSiO)_c(R_2SiO)_d$, where X is $-ONR_2$, a and d are equal to or greater than O, b and c are equal to or greater than 1, c plus d is equal to or greater than 3, and R is a monovalent radical selected from the group consisting of hydrogen, hydrocarbon or substituted hydrocarbon.

21. The composition of claim 20 wherein the nucleophilic catalyst is diethylhydroxylamine.

22. A two part, curable composition comprising the polymer of claim 1 and a catalyst selected from the group consisting of platinum, palladium, rhodium, ruthenium, aluminum, zinc, tin, iron, and their salts in one part and an organosilicon compound containing 1 or more SiH bonds in the second part.

23. The two part composition of claim 22 in which the catalyst in one part being platinum.

24. A curable composition comprising the polymer of claim 1, a platinum containing catalyst, and carbon black.

* * * * *